J. L. SAEGMULLER & A. GREBE.
LEVELING MECHANISM FOR ENGINEERING AND SURVEYING INSTRUMENTS.
APPLICATION FILED DEC. 13, 1909.

955,911.
Patented Apr. 26, 1910.
2 SHEETS—SHEET 1.

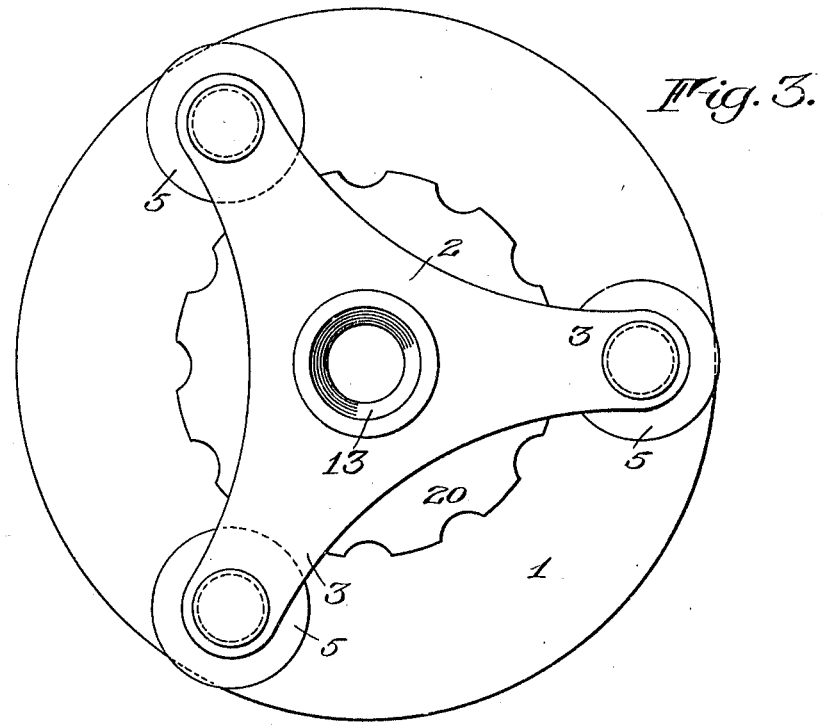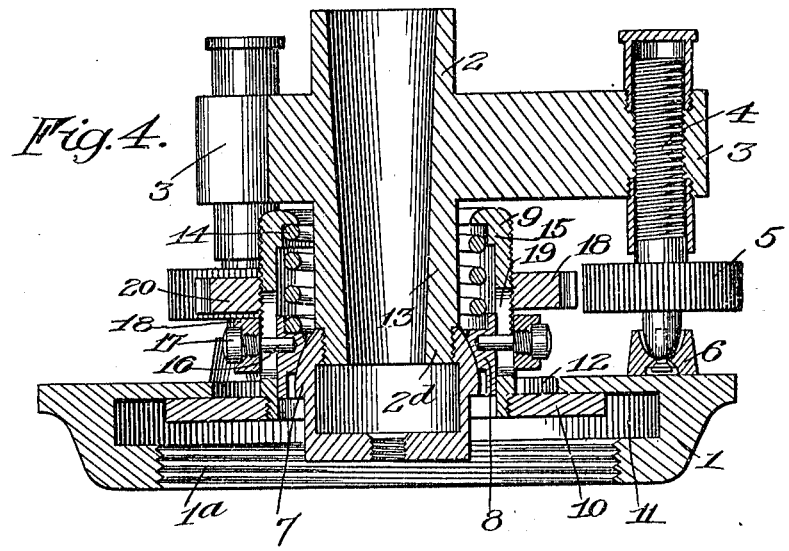

UNITED STATES PATENT OFFICE.

JOHN L. SAEGMULLER AND ALBERT GREBE, OF ROCHESTER, NEW YORK, ASSIGNORS TO BAUSCH & LOMB OPTICAL COMPANY, OF ROCHESTER, NEW YORK, A CORPORATION OF NEW YORK.

LEVELING MECHANISM FOR ENGINEERING AND SURVEYING INSTRUMENTS.

955,911.     Specification of Letters Patent.     Patented Apr. 26, 1910.

Application filed December 13, 1909. Serial No. 532,811.

*To all whom it may concern:*

Be it known that we, JOHN L. SAEGMULLER and ALBERT GREBE, both of the city of Rochester, in the county of Monroe and State of New York, have invented certain new and useful Improvements in Leveling Mechanisms for Engineering and Surveying Instruments; and we do hereby declare the following to be a full, clear, and exact description of the same, reference being had to the accompanying drawings, forming a part of this specification, and to the reference-numerals marked thereon.

The present invention relates to leveling mechanisms for engineering and surveying instruments, such as levels, transits, theodolites, tachometers, and other similar instruments, and the object of this invention is to provide a construction having a resilient connection between the leveling frame and the tripod attaching base so constructed that a more compact arrangement of parts is obtained.

Still another object of the invention is to provide for preventing the leveling frame with the instrument carried thereby from moving relatively to the tripod attaching base when the instrument is being transported or carried by means of the tripod.

To these and other ends the invention consist in certain improvements and combinations of parts all as will be hereinafter more fully described, the novel features being pointed out in the claims at the end of the specification.

Figure 1:
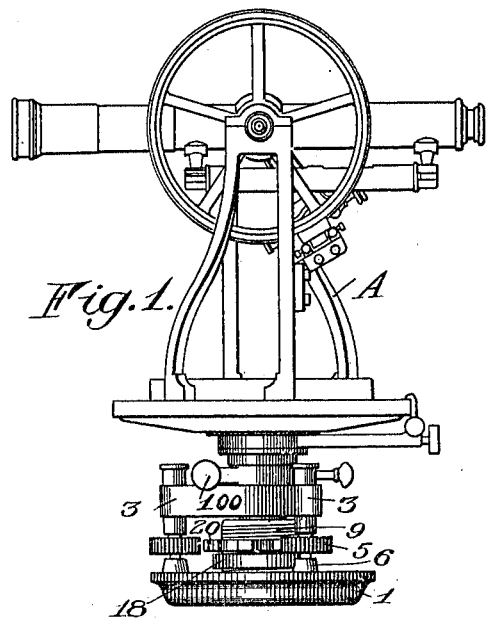
Figure 2:
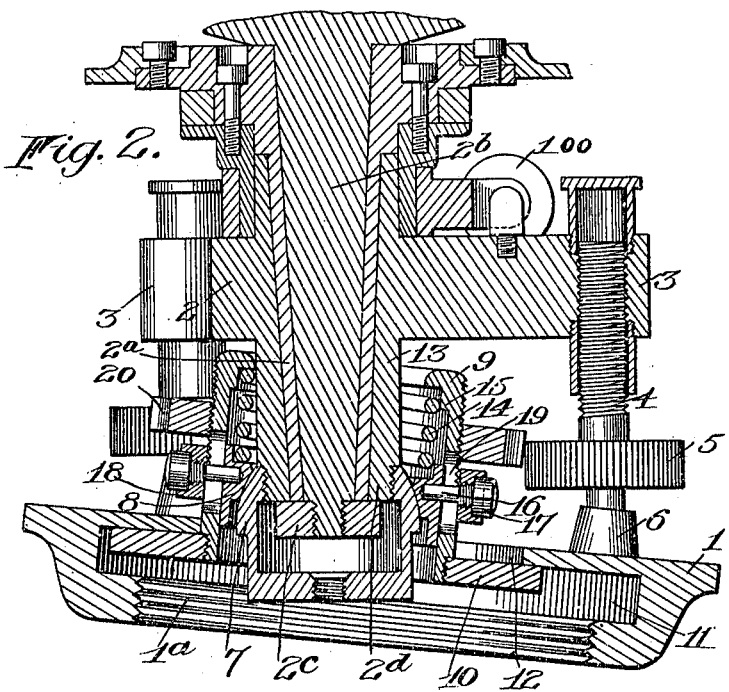

In the drawings: Figure 1 is a side view of a surveying instrument mounted upon the improved leveling mechanism; Fig. 2 is a central vertical sectional view of the leveling mechanism with the base at an angle to the leveling frame; Fig. 3 is a top view of the leveling mechanism with the instrument detached therefrom, and Fig. 4 is a vertical and axial section of the leveling mechanism.

Two types of leveling mechanism for surveying and engineering instruments are now in general use, one having a four screw adjustment and the other a three screw adjustment. The former is a more compact structure and does not have a resilient connection between the leveling frame and the tripod attaching base, but it is objectionable in that more care is required for effecting the adjustment as two screws must be simultaneously operated. The three screw adjustment, while easier to operate, has been objectionable for the reason that previous structures have not been compact and the resilient connection of the tripod permitted the instrument or telescope to vibrate during the carrying of the same by means of the tripod.

In this invention a structure is provided which may utilize but three adjusting screws and the resilient connection between the leveling frame and the tripod attaching base is so constructed that a very compact arrangement of parts is secured. Further, the structure has provision which permits the instrument to be carried by means of the tripod without subjecting the instrument to vibration.

In this embodiment the invention is shown as applied to a surveying transit and the latter has the usual adjustable connection 100 with the leveling frame 2, a tapering sleeve bearing $2^a$ being provided to receive the spindle $2^b$ of the instrument which is held in position by a nut $2^c$ engaging the end of the bearing $2^d$ and the end of the bearing $2^a$.

A base 1 adapted by screw $1^a$ for attachment to a tripod has the leveling frame supported thereon. The latter in this instance has three arms 3, each of which may have operating therethrough near its free end, an adjusting screw 4 that is operable by means of a thumb wheel 5 and loosely carries a foot 6 frictionally bearing against the table or top surface of the base 1, it being apparent that when any one of the screws 4 is turned the leveling frame as a whole turns about an axis passing through the other two screws. In order to permit this relative movement between the leveling frame and the base and at the same time to connect said parts against separation there is provided a resilient connection comprising in this instance a ball and socket joint. This joint may consist of a ball member 7 rigidly secured to the leveling frame 2 and preferably detachably connected to the lower end thereof in order that the leveling frame may be separated from the base. With this ball coöperates a downwardly opening socket member 8 movably arranged within a casing 9 carried by a slidable member 10 that in turn is arranged within an annular chamber 11 and frictionally coöperates with the top wall of said chamber to permit the horizontal movement of the leveling frame, the casing projecting in this instance through a central opening 12 in the base 1 and surrounding the depending portion 13 of the leveling frame 2. Also arranged within the casing 9 is resilient means, such as a helically coiled spring 14, which bears at its lower end against the socket member 8 and its upper end against the flange 15 at the upper end of the casing 9. This spring acts downwardly on the socket member to press the latter into engagement with the ball member 7 and holds the foot pieces 6 in engagement with the table or top surface on the base 1, while at the same time said spring permits the socket member to yield when the screws are adjusted and, of course, the ball joint permits a tilting movement of the leveling frame.

Another feature of this invention comprises a locking device which coöperates with the resilient connection in such a manner as to prevent the latter acting and preferably with the movable member of the ball and socket joint. The movable member in this embodiment is the socket member 8 and is engaged by radial pins 16 projecting through slots 19 from the inner ends of screws 17 that are carried by a ring 18 surrounding the casing 9. A locking ring or nut 20 also surrounds the casing 9 and has screw threaded engagement therewith so as to move into and out of the path of the ring 18. To level the instrument, the nut 20 is raised on the casing 9 and the screws 4 are turned, the spring 14 permitting the movable member 8 to accommodate itself to the vertical adjustment while the ball and socket permits the lateral or tilting movement of the leveling frame. When the instrument is to be carried by its tripod, the nut 20 is moved into engagement with the ring 18 and the movable member 8 of the ball and socket joint is held against movement. It will be noted that in this embodiment the leveling frame has one member of the ball and socket joint rigidly secured thereto while the other member is movably supported on the base. This arrangement of the parts permits the spring to be located above the base so that a more compact structure may be obtained. The invention further makes it possible to prevent any vibration of the leveling frame on the base so that the instrument may be carried by the tripod.

We claim as our invention:

1. In a leveling mechanism, the combination with a base and a leveling frame, of a casing carried by the base and surrounding a portion of the leveling frame, a ball and socket joint having one member movable in the casing and the other member rigidly secured to the leveling frame, and resilient means acting on the movable member and arranged in the casing.

2. In a leveling mechanism, the combination with a base and a leveling frame, of a casing projecting upwardly from the base, a ball and socket joint having one member movable in the casing and the other member rigidly secured to the leveling frame, and resilient means arranged in the casing above the movable member of the joint and coöperating with the latter.

3. In a leveling mechanism, the combination with a base, a shiftable member movable horizontally thereon, and a leveling frame, of a ball and socket joint having one member rigidly secured to the leveling frame and the other member movable on the shiftable member, and resilient means acting on said movable member of the joint.

4. In a leveling mechanism, the combination with a base having a central opening, of a shiftable member movable horizontally thereon, a casing projecting upwardly from the shiftable member through the central opening, a leveling frame having a portion extending into the casing, a ball and socket joint having one member rigidly secured to the frame and the other member movable in the casing, and resilient means arranged in the casing above the movable member of the joint and coöperating with the latter.

5. In a leveling mechanism, the combination with a base and a leveling frame, of a resilient connection between them, and means for locking said resilient connection against action.

6. In a leveling mechanism, the combination with a base and leveling frame, of a ball and socket joint connecting them, one of the members of which is resiliently supported, and means for locking the resiliently supported member against movement.

7. In a leveling mechanism, the combination with a base and a leveling frame, of a ball and socket joint connection between them, one of the members of the connection being resiliently supported so as to move relatively to the base, adjusting screws carried by the frame and coöperating with the base, and a device for locking the resiliently supported member against movement.

8. In a leveling mechanism, the combination with a base and a leveling frame, of a ball and socket joint connecting them, one of the members of the joint being rigidly secured to the leveling frame and the other being resiliently supported on the base, and locking means coöperating with the resiliently supporting members of the joint.

9. In a leveling mechanism, the combination with a base and a leveling frame, of a ball and socket joint connecting them having a movable member, resilient means supporting said member, a casing surrounding the resilient means and a nut turning on the casing and adapted to coöperate with the movable member to hold the latter against movement.

10. In a leveling mechanism, the combination with a base and a leveling frame, of a ball and socket joint connecting them having a member rigidly secured to the leveling frame and a member movably supported by the base, resilient means acting on the movable member and a nut movable to coöperate with the movable member of the joint.

11. In a leveling mechanism, the combination with a base and a leveling frame, of a ball and socket joint connecting them having a member rigidly secured to the leveling frame and a member movably supported by the base, resilient means acting on the movable member, a casing surrounding said resilient means, and a nut turning on the casing to coöperate with the movable member of the joint.

12. In a leveling mechanism, the combination with a base having a chamber therein provided with an opening in its top, of a member slidably arranged and having a slotted casing projecting upwardly through the opening, a leveling frame having a portion extending into the casing, a ball and socket joint having one member rigidly secured to the support and the other member movable in the casing, resilient means in the casing acting on the movable member, a ring surrounding the casing and connected through the slots with the movable member, and a nut operating on the casing to engage the ring.

JOHN L. SAEGMULLER.
ALBERT GREBE.

Witnesses:
  HENRY C. THON,
  DANIEL M. SMITH.